United States Patent
Doberstein et al.

(10) Patent No.: US 6,293,773 B1
(45) Date of Patent: Sep. 25, 2001

(54) CORROSION-RESISTANT SLEEVE FOR MAGNETIC ROTORS

(75) Inventors: Helge Doberstein, Leverkusen; Jürgen Krämer, Langenfeld, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/442,917

(22) Filed: Nov. 18, 1999

(30) Foreign Application Priority Data

Nov. 20, 1998 (DE) .............................. 198 53 563

(51) Int. Cl.[7] ..................................... F04B 17/00
(52) U.S. Cl. ........................ 417/420; 417/423.7
(58) Field of Search ................ 417/420, 423.1, 417/423.11, 423.12, 423.7

(56) References Cited

U.S. PATENT DOCUMENTS

| | | | |
|---|---|---|---|
| 3,572,982 | * 3/1971 | Kozdon | 417/423.7 |
| 4,850,818 | 7/1989 | Kotera | 417/366 |
| 5,017,102 | 5/1991 | Shimaguchi et al. | 417/420 |
| 5,129,795 | * 7/1992 | Hyland | 417/423.12 |
| 5,334,004 | * 8/1994 | Lefevre et al. | 417/420 |
| 5,580,216 | 12/1996 | Munsch | 415/122.1 |

FOREIGN PATENT DOCUMENTS

| | | |
|---|---|---|
| 3413930 | 10/1985 | (DE) . |
| 3636405 | 4/1988 | (DE) . |
| 3545713 | 2/1990 | (DE) . |
| 2672344 | 8/1992 | (FR) . |

* cited by examiner

Primary Examiner—Charles G. Freay
Assistant Examiner—Michael K. Gray
(74) Attorney, Agent, or Firm—Joseph C. Gil; Noland J. Cheung

(57) ABSTRACT

A description is given of a corrosion-resistant sleeve (7) for magnetic rotors (20, 21) of pumps, in particular for plastic-encapsulated magnetic rotors in centrifugal pumps, which effectively protects the rotors of laboratory centrifugal pumps from corrosion and premature wear.

7 Claims, 1 Drawing Sheet

CORROSION-RESISTANT SLEEVE FOR MAGNETIC ROTORS

FIELD OF THE INVENTION

Figure 1:
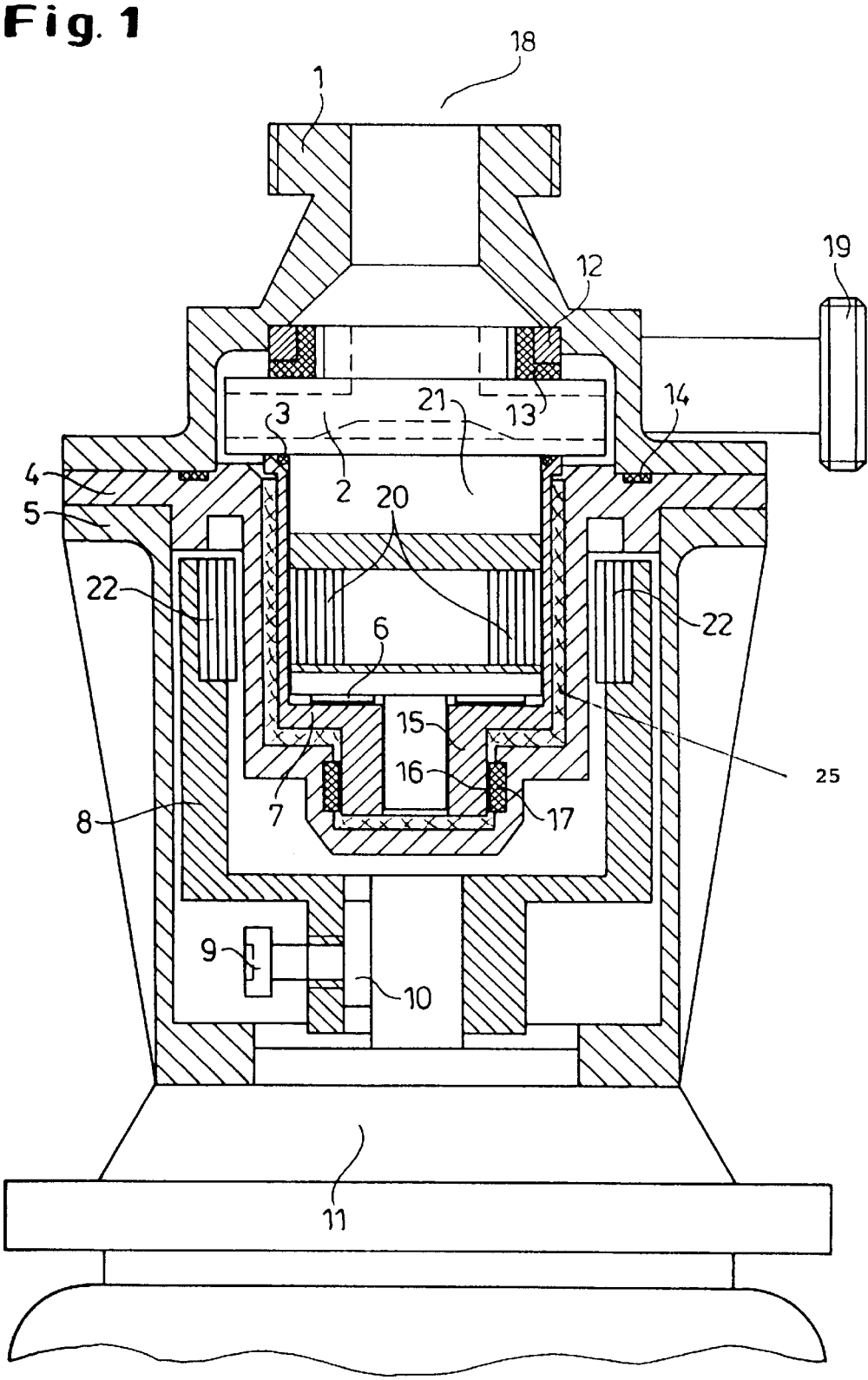

The present invention relates to a corrosion-resistant sleeve for magnetic rotors of pumps, in particular for plastic-encapsulated magnetic rotors in centrifugal pumps, which effectively protects the rotors of laboratory centrifugal pumps from corrosion and premature wear.

BACKGROUND OF THE INVENTION

The known, commercially available laboratory centrifugal pumps are typically fitted with plastic-encapsulated magnetic rotors. The plastic covers of such rotors usually have a layer thickness of approximately 1 to 2 mm and do not protect the magnet of the rotor from corrosive substances which diffuse in (delivery medium).

The penetration of delivery medium leads to considerable corrosion to the rotor magnet. The expansion of the magnets which is associated with the corrosion in turn leads to the formation of cracks in the protective plastic cover and thus to an increase in the rotor diameter.

Consequently, the initial result is contamination of the deliver) medium, and the ultimate result is that the rotor becomes blocked, leading to total failure of the pump. Depending on the type and concentration of the constituents which attack the protective plastic cover of the magnetic rotor, changes in the rotor are visible even after a few days or weeks.

SUMMARY OF THE INVENTION

The object of the invention is to develop effective protection for magnetic rotors which substantially prolongs the service life of the rotors, and therefore also of the pumps which contain magnetic rotors.

The object of the invention is achieved by the fact that the magnetic rotor is covered with a thin, corrosion-stable, tightly fitting metal sleeve in the area of the magnets.

The subject matter of the present invention is a corrosion-resistant sleeve for magnetic rotors, in particular for plastic-encapsulated magnetic rotors in centrifugal pumps, which tightly surrounds the plastic-covered rotor and seals it off from the chamber containing the delivery medium.

BRIEF DESCRIPTION OF THE INVENTION

FIG. 1 shows a cross section through a modified laboratory modified laboratory centrifugal pump.

DETAILED DESCRIPTION OF THE INVENTION

The corrosion-resistant sleeve preferably comprises metal, in particular titanium or acid- or alkali-resistant material, e.g. Hastelloy C4.

The invention is explained in more detail below, by way of example, with reference to FIG. 1, which shows a cross section through a modified laboratory centrifugal pump.

EXAMPLE

A modified laboratory centrifugal pump has the following structure. The housing 1 of the pump, on which inlet connection piece 18 and outlet connection piece 19 are arranged, accommodates the rotor disc 2, with internal magnet 20 and the plastic cover 21.

The magnetic rotor is tightly surrounded, so that it is covered all the way to the rotor disc 2, with a protective sleeve 7 which is made from titanium and is additionally sealed on the rotor disc 2 by means of an 0-ring seal 3 and on the head of the magnet by a flat seal 6. An annular seal 14 prevents fluid delivery material from passing through from the housing 1, 4. The end of the protective sleeve 7 serves, firstly, as a shaft in the sliding-contact bearing 16 which is embedded in the internal cap 4. Secondly, in this part, the protective sleeve has an internal screw thread 15, by means of which the sleeve 7 is screwed onto the end of the rotor. In the area of the internal magnets 20, the wall thickness of the protective sleeve is approximately 0.8 mm.

The cap 4 separates the internal magnet 20 and the plastic cover 21 from the chamber 25 formed by the lower housing 5, which surrounds the diagramatically depicted motor 11 and the outer magnet 8 with magnets 22. The outer magnet holder 8 is connected to the drive shaft via the bolt 9 and the feather key 10. A ring 12 and an angle ring 13 with screw thread secure the rotor disc 2 inside the housing 1.

The present structural form has made it possible, using titanium as chlorine-resistant metal for the protective sleeve, to achieve a service life of more than a year for the centrifugal pump which is equipped therewith. In this case, the pump was in contact with chlorine-containing brine at a temperature of approximately 85° C.

Similar protection with the aid of an alkali-resistant protective sleeve from hastelloy likewise allowed the centrifugal pump to operate for a year without interruption or corrosion.

What is claimed is:

1. A pump having at least one magnetic rotor, said pump comprising:
    a corrosion-resistant sleeve and plastic cover, wherein said corrosion-resistant sleeve is disposed within a chamber and said plastic cover is sealably placed over said corrosion-resistant sleeve to tightly surround said magnetic rotor with said plastic cover and said corrosion-resistant sleeve sealing said magnetic rotor from a delivery medium, said magnetic rotor driving a pumping means of said pump.

2. A pump according to claim 1, wherein said pump is a centrifugal pump.

3. A pump according to claim 1, wherein said sleeve comprises metal.

4. A pump according to claim 3, wherein said sleeve comprises a titanium metal.

5. A pump according to claim 3, wherein said sleeve comprises an acid or alkali-resistant material.

6. A pump according to claim 3, wherein said sleeve comprises a Ni—Mo—Cr alloy.

7. A pump according to claim 1, wherein a seal is disposed between said plastic cover and said sleeve.

* * * * *